(12) United States Patent
Krooss et al.

(10) Patent No.: US 6,502,688 B1
(45) Date of Patent: Jan. 7, 2003

(54) METHOD AND APPARATUS FOR HIGH SPEED PLASTIC CONTAINER UNSCRAMBLING

(75) Inventors: Robert J. Krooss, Mountain Lakes, NJ (US); Kenneth Regula, Sparta, NJ (US)

(73) Assignee: Pace Packaging Corp., Fairfield, NJ (US)

(*) Notice: Subject to any disclaimer, the term of this patent is extended or adjusted under 35 U.S.C. 154(b) by 29 days.

(21) Appl. No.: 09/699,901

(22) Filed: Oct. 30, 2000

(51) Int. Cl.⁷ .............................................. B65G 43/08
(52) U.S. Cl. ....................................... 198/395; 198/411
(58) Field of Search ................................. 198/395, 599, 198/401, 411, 400, 397, 408

(56) References Cited

U.S. PATENT DOCUMENTS

| | | |
|---|---|---|
| 3,960,267 A | 6/1976 | Valo |
| 4,199,049 A | 4/1980 | Vamvakas |
| 4,257,516 A | 3/1981 | Ionescu |
| 4,428,474 A | 1/1984 | Gau et al. |
| 4,854,442 A * | 8/1989 | Krooss ...................... 198/400 |
| 4,895,243 A | 1/1990 | Graham et al. |
| 4,995,503 A | 2/1991 | Graham et al. |
| 5,009,305 A | 4/1991 | Auld et al. |
| 5,040,662 A | 8/1991 | Clark et al. |
| 5,439,093 A * | 8/1995 | Drewitz ...................... 198/399 |

* cited by examiner

Primary Examiner—Kenneth W. Noland
(74) Attorney, Agent, or Firm—Stephen E. Feldman

(57) ABSTRACT

The present invention is directed to a high-speed container unscrambler. The invention comprises of an apparatus for alignment, orientation of containers and sets of conveyor belts between which the containers are placed. The alignment mechanism has a photo eye that detects a presence of a container and a servomotor that is activated by the photo eye. The servomotor has a three hook arm mounted to it, which serves to lift the containers by their leading end when they are coming with a neck leading position. When containers are coming in with a base leading position, the hook does not engage the containers and the containers are passing by without engagement. The containers are released between the conveyor belts aligned in the same position and move towards an orientation mechanism, which places the containers in an all-standing position. The orientation mechanism comprises of a photo eye, which detects a presence of a container, and a servomotor, that is activated by the photo eye. The servomotor has a pocketed wheel mounted on it, which serves to engage containers and rotate them to all standing position. Once the containers are oriented in all standing position, they are released between the belts and proceed for further processing.

41 Claims, 5 Drawing Sheets

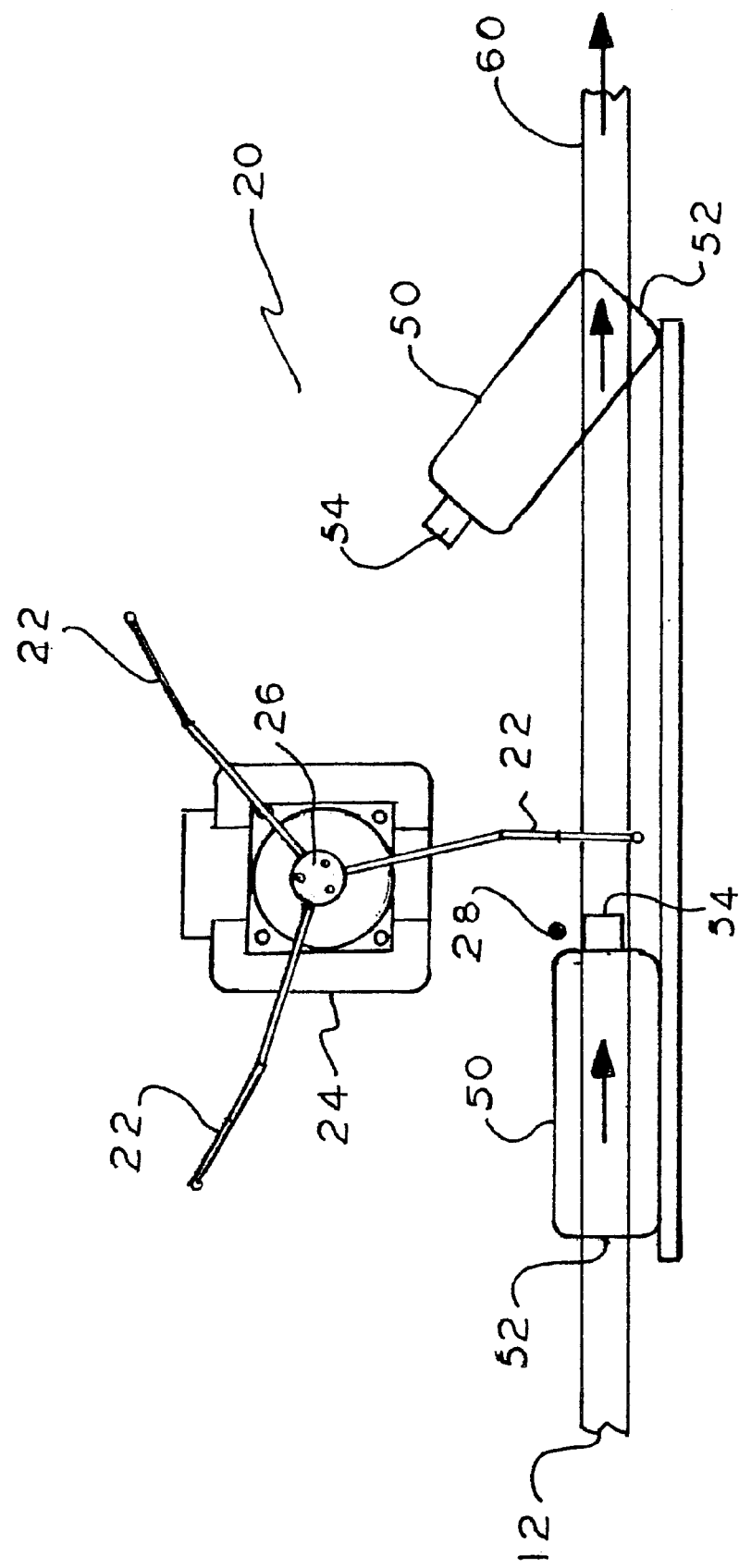

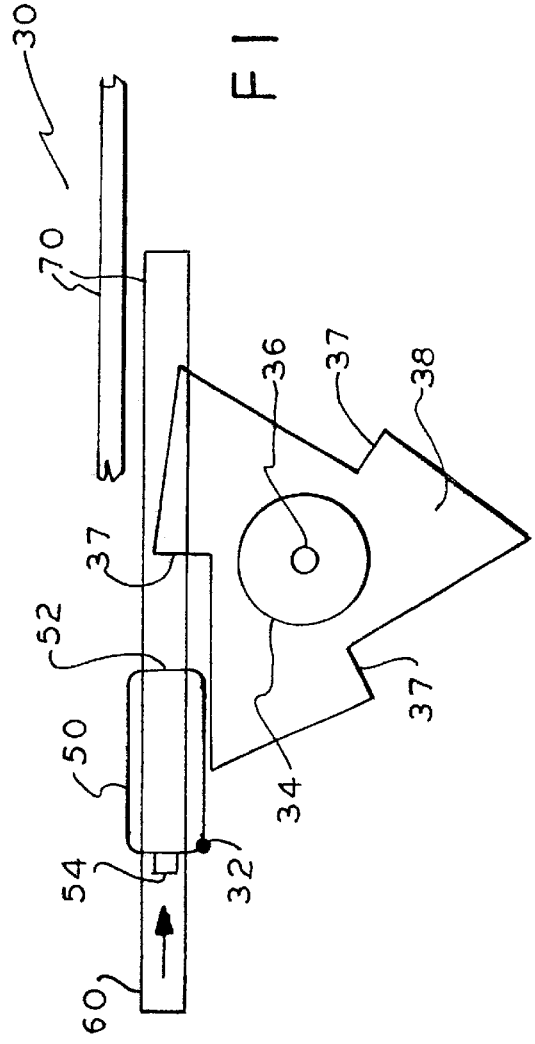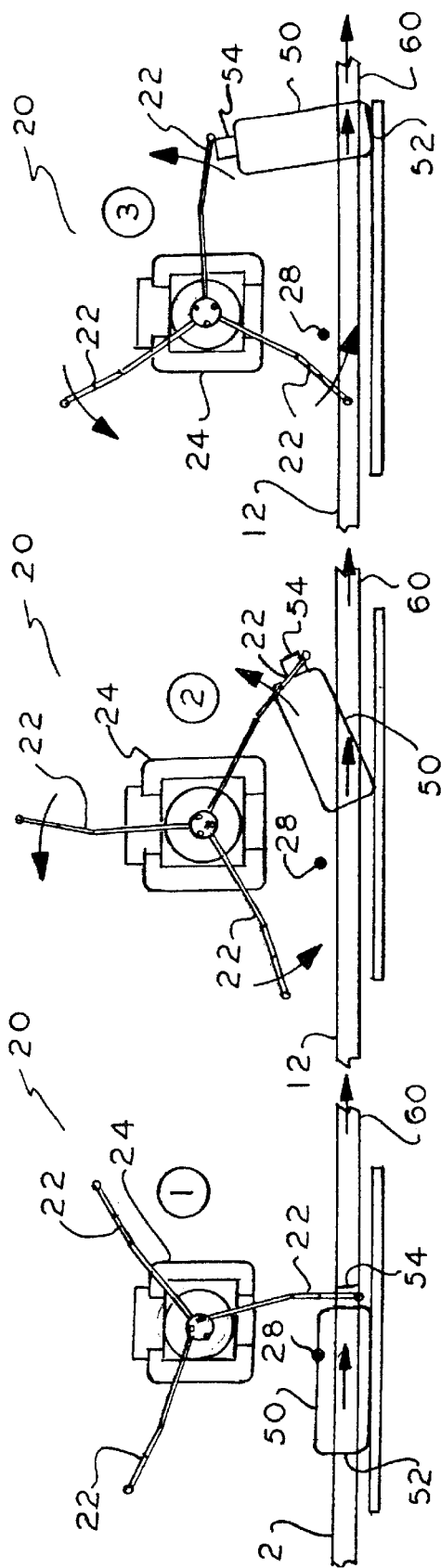

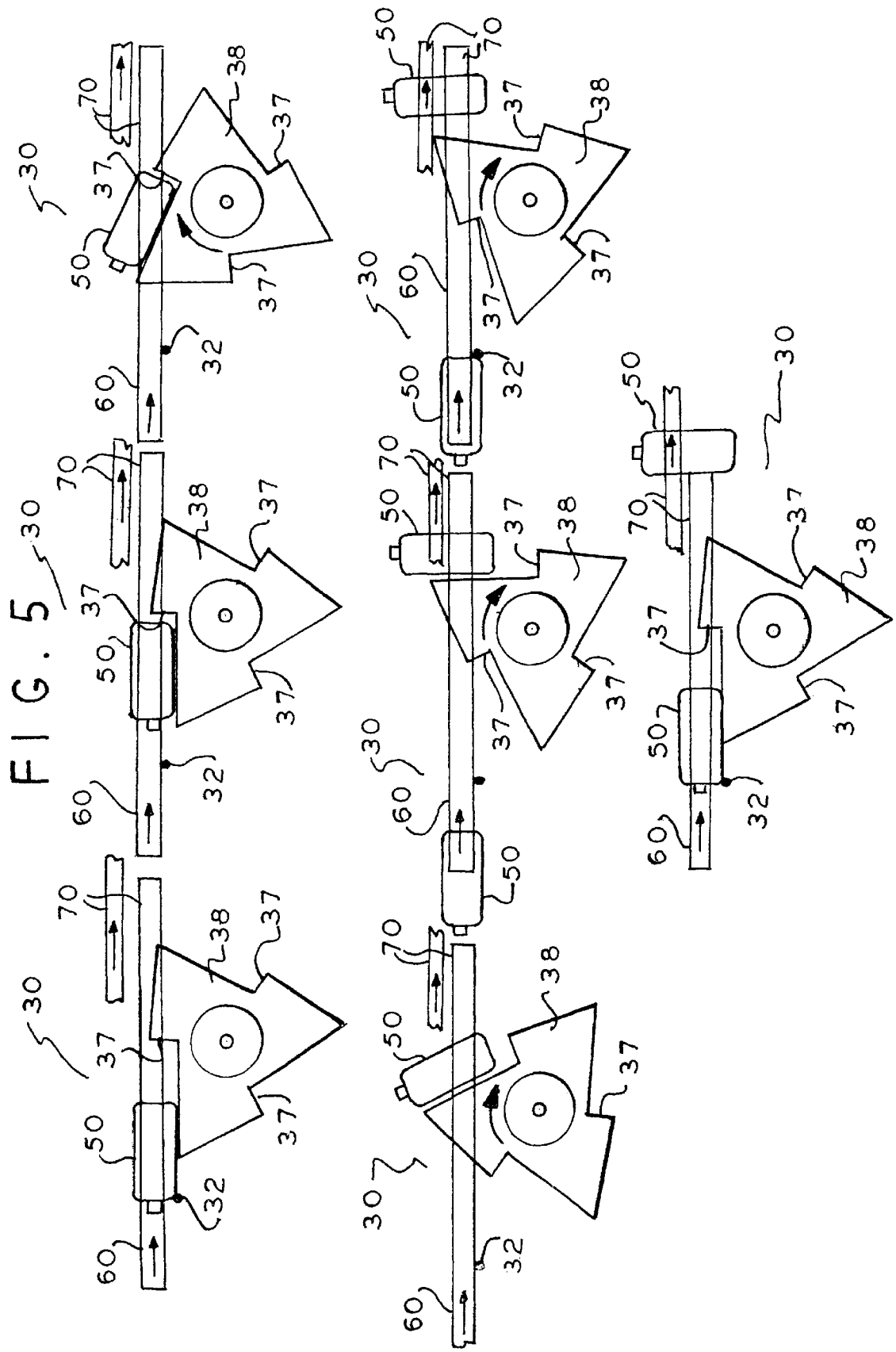

METHOD AND APPARATUS FOR HIGH SPEED PLASTIC CONTAINER UNSCRAMBLING

FIELD OF INVENTION

The present invention relates to a method and apparatus of high speed sorting and orienting of plastic containers to base leading position, so that the containers can be further processed and placed in an upright position. The method and apparatus are used in the processing plants where it is necessary to have containers moving at a high rate of speed to assure prompt placement and packaging of the containers.

BACKGROUND OF THE INVENTION

There are several methods and apparatuses that are conventionally well known. The present technology presently known is described below. In the present technology the containers are filled, capped, labeled, boxed, etc. on a "filling line", a series of machines that sequentially perform various required operations. The containers begin their travel down the "filling line" conveyor in three ways:
  (i) by means of hand placement from bulk to standing position on the filling line conveyor;
  (ii) by means of an unscrambler—a machine that takes the containers from a jumble to a standing position on the filling line conveyor; or
  (iii) by means of a depalletizer—a machine that takes the containers from a standing position on cardboard sheets that are stacked one on the other to form a pallet load to a standing position on the filling line conveyor.

There are several problems that are associated with the above-described technologies. With respect to the hand placement technology, the main drawbacks are the cost of the operation and a very low speed limit. The speed of placement of the containers is about 50 to 60 containers per minute, which is insufficient for the fast moving conveyors and packaging processes. With respect to the unscrambler technology, it is relatively inexpensive, however, present trends provide certain deficiencies, discussed below, and limit the speed to just under 500 containers per minute. Finally, the depalletizer technology is an expensive way to accommodate the needs that the present invention addresses. Furthermore, the depalletizer technology, while providing high-speed container sorting and orienting of up to 300 to 1200 containers per minute, is extremely large, thus, providing an inconvenience of use and operation.

The present unscrambler technology that is available provides the following sequence of operation. The containers are fed manually or semi-automatically into the supply hopper. Then, containers are automatically released to the rotary disc under control of a photo eye that monitors the disc. In the rotary disc, the containers move by a centrifugal force to an outer track in a neck leading or base leading position and exit to the stand-up section. In the stand-up section, a hook is located in the path of the containers. The neck-leading containers are engaged by the hook. The leading end of the containers is lifted out of the belt line while their trailing end remains in the belt line. The trailing end passes under what had been the leading end. The entire container is pulled back into the belt line. It is now in a base leading position. With respect to the base leading containers, they reach the hook and are pushed past the hook and thus remain in the base leading position. There are two essential features of the present orienting technology. First, the hook pivots on the shaft of a rotary device and is returned to its original position in the path of the containers after each container passes. Second, the force that moves the hook and pivots each container is transmitted from the belts through the container to the hook.

The containers, traveling in a base leading position, are further processed to place the containers in the upright position. The present technology operates as follows. The containers are traveling in a base leading position are carried between two belts. They come against a stop, located in the path of the lower edge of the base of the container. The force of the belts on the sides of the container pulling the container forward and the force of the stop on the lower edge of the base, combine to exert a twisting force on the container that moves it approximately 90 degrees of arc from a base leading position to a standing position.

There are several problems that are associated with the present technology that the invention addresses. The main problem is low speed at which the unscrambler has to operate. The speed is limited because it takes a finite time for the hook to return to its original position in the path of the containers. Furthermore, the containers slip while they are moved by the belt, due to the inertia force that is associated with the lifting of the containers. Therefore, the speed must be lowered to accommodate for such problem. Finally, the containers also get damaged because of the force and the nature of the plastic that the containers are manufactured from. Current technologies allow speeds of up to 500 containers per minute, which is insufficient to fulfill the needs of the container processing and packaging industry. Furthermore, there are similar problems that are associated with the lifting up containers to a standing position. Such problems include container damage and low speed limit when processing the containers.

There are several U.S. patents that are available in the field of high-speed container sorting and unscrambling, however, none of them address the long felt need that the present invention does.

U.S. Pat. No. 4,199,049 to Vamvakas discloses an apparatus for unscrambling a mass of uniform size containers and loading them in large groups onto a continuously moving conveyor. The unscrambler in this patent has a feeding table, a container receiving and transporting mechanism at one side of the feeding table. The apparatus includes a rotary transporting device having a plurality of rigidly connected transporting wheel structures equal in number to the number of container receptacles in a row, each of these wheel structures having one set of two container carrier recesses opening radially outwardly and specifically spaced circumferentially so that the rotation of the wheel structure timed to the drive of the transporting mechanism will bring a first container carrier recesses opposite a first row receptacle on the transporting mechanism, and will bring the second of the container carrier recesses opposite a second row receptacle on the transporting mechanism. The applicant's invention defines a patentable subject matter by having a photo eye sequentially connected to the servomotor that is in turn connected to the three-arm hook. The three-arm hook is capable of rotation according to the signals being supplied by the photo eye. The photo eye detects whether the container is coming in base leading or neck-leading.

U.S. Pat. No. 4,257,516 to Ionescu discloses a container orienting device at high speed a train of successively advancing, randomly oriented containers having an open and a closed end into a train of container having a uniform orientation. The apparatus comprises of an endless belt and a roller mechanism and a plurality of pulleys. The present invention defines a patentable subject matter over Ionescu patent. The present invention contains a three-arm hook that is capable of rotation based on signals sent from the photo eye when a container passes through it. The photo eye determines whether the container is passing through neck leading or base leading. Furthermore, the speed that is allowable by the Ionescu patent is far less than the one allowable by the present invention.

U.S. Pat. No. 4,428,474 to Gau et al. teaches an apparatus for the alignment of containers. The apparatus comprises a rotating radial unit that has a container receiving recesses on its periphery for accepting containers from a linear conveyor. Furthermore, the apparatus comprises a pair of elements mounted on the unit adjacent each receiver for moving towards and away from the receiver. A belt runs around rolls that are on both elements so portion of the belt grip a container on each side when the elements are moved toward each other automatically. The apparatus comprises a sensing element that permits the rotation of the motor that allows realigns the containers in the same order. The present invention comprises of a three-arm hook that is capable of rotation due to the signals that it receives from the photo eye. The three-arm hook is capable of rotating at high speed and is capable of properly discriminating between the containers that are base leading or neck leading.

U.S. Pat. No. 5,040,662 to Clark et al. teaches a method and apparatus for transferring glass or metal containers to all standing position. The apparatus consists of an intermittently driven feed conveyor for feeding containers between stationary guides which positions the flat ends of containers upon a pair of narrow flat belts trained around annuluses secured to a driven star wheel having equally spaced carriers thereon which move between the guides and push the containers onto a linear upper run of the belts which are driven at a higher arcuate speed than the annuluses for assuring the upper ends of the carriers do not contact and cause the containers to be dislodged from their flat surfaces. The present invention is patentably distinct from this piece of prior art due its having a photo eye that drives a servomotor that in turn rotates a three hook arm. The three hooks on the arm spaced 120 degrees of arc apart and are capable of realigning the containers to identically leading positions.

U.S. Pat. No. 3,960,267 to Valo discloses a device for moving logs from a first longitudinal conveyor onto a crossing second conveyor and for turning the logs the desired end first on the conveyor. The device comprises two side walls positioned at each of said conveyor, said side walls forming each two oppositely facing sliding surfaces inclined in the longitudinal direction of the second conveyor. Each side wall is provided with a guiding means, which are being pivotal in opposite directions for guiding each log selectively upon two oppositely facing sliding surfaces of the walls to cause the log to turn in the desired direction while sliding along the sliding surfaces onto the second conveyor. The applicant's invention comprises a photo eye connected to a servomotor, which has a pocketed wheel mounted on it. When the photo eye detects a container, it triggers rotation of the pocketed wheel, which in turn places the container in a standing position on the conveyor.

U.S. Pat. No. 4,895,243 to Graham et al. discloses a star wheel selecting apparatus. The apparatus has an optical sensor that is capable of interruption of the star wheel's rotation. The star wheel serves as a cap selection apparatus in conjunction with the sensing means. The applicant's invention comprises an apparatus that has a container aligning mechanism and a container orienting mechanism, which work in conjunction of two photo eyes that trigger rotation of both mechanisms. The aligning mechanism comprises of hooks pivotally mounted on the axis of the alignment mechanism and the orienting mechanism comprises pockets, which are pivotally mounted on the orienting mechanism.

U.S. Pat. No. 4,995,503 to Graham et al. discloses a star wheel cap selecting apparatus. The structure of this apparatus is similar to the '243 Graham patent. Therefore, the present invention presents a distinct patentable subject matter over this prior art.

U.S. Pat. No. 5,009,305 Auld et al. teaches article orientators. The orientator has a plurality of article holders that are capable of independent movement. The present invention discloses an apparatus that has a container aligning mechanism and a container orienting mechanism, which work in conjunction of two photo eyes that trigger rotation of both mechanisms. The aligning mechanism comprises of hooks pivotally mounted on the axis of the alignment mechanism and the orienting mechanism comprises pockets, which are pivotally mounted on the orienting mechanism.

The prior art in question presents numerous problems that the present invention addresses and resolves. These problems are low speed sorting of containers and damaging of such containers when they are on the conveyor. The present invention addresses a long felt but unfulfilled need for a better container unscrambling apparatus and method.

SUMMARY OF THE INVENTION

The present invention is directed towards a high-speed container unscrambler.

The present invention is directed towards a high-speed container unscrambler for container alignment to all base leading position.

The present invention is directed towards a high-speed container unscrambler for container orientation to all vertical position.

The present invention is directed towards a high-speed container unscrambler having a three-hook arm and a photo eye.

The present invention is directed towards a high-speed container unscrambler having a three-hook arm with hooks juxtaposed at 120 degree of arc from each other.

The present invention is directed towards a high-speed container unscrambler having a pocketed wheel.

The present invention is directed towards a high-speed container unscrambler having a pocketed wheel for rotation of containers towards an all standing position.

The present invention is directed towards a high-speed container unscrambler having a sorting speed of 500 to 1200 containers per minute.

Other objects of the present invention will become apparent from the following description.

BRIEF DESCRIPTION OF THE DRAWINGS

The following description of preferred embodiment of the present invention will be better understood when read in conjunction with the appended drawings. It should be understood, however, that the invention is not limited to the precise arrangements shown in which:

FIG. 2 is a plain view of the high-speed container unscrambler's container alignment mechanism.

FIG. 3 is a plain view of the high-speed container unscrambler's container orientation mechanism.

FIG. 4 is a plain view of the high-speed container unscrambler's container alignment mechanism, where containers are shown being processed by the container alignment mechanism in all neck leading position.

FIG. 5 is a plain view of the high-speed container unscrambler's container orientation mechanism, where containers are shown being processed by the container orientation mechanism.

DESCRIPTION OF THE PREFERRED EMBODIMENT

The present invention relates to a high-speed container unscrambler. The present invention would be better understood in conjunction with a following description of a preferred embodiment. However, it is understood by one skilled in the art that the present invention is not limited to the above referenced specific embodiment, but other embodiments are allowable, provided they are within the scope and spirit of the following claims.

In the following description, references to the drawings, certain terms are used for conciseness, clarity and comprehension. It is assumed by one skilled in the art that there are to be no unnecessary limitations implied from the such references, besides the limitations imposed by the prior art, because such terms and references are used for descriptive purposes only and intended to be broadly construed. Furthermore, the description and the drawings are for illustrative purposes only and not to be construed as limited to the exact details shown, depicted, represented, or described.

Figure 1:
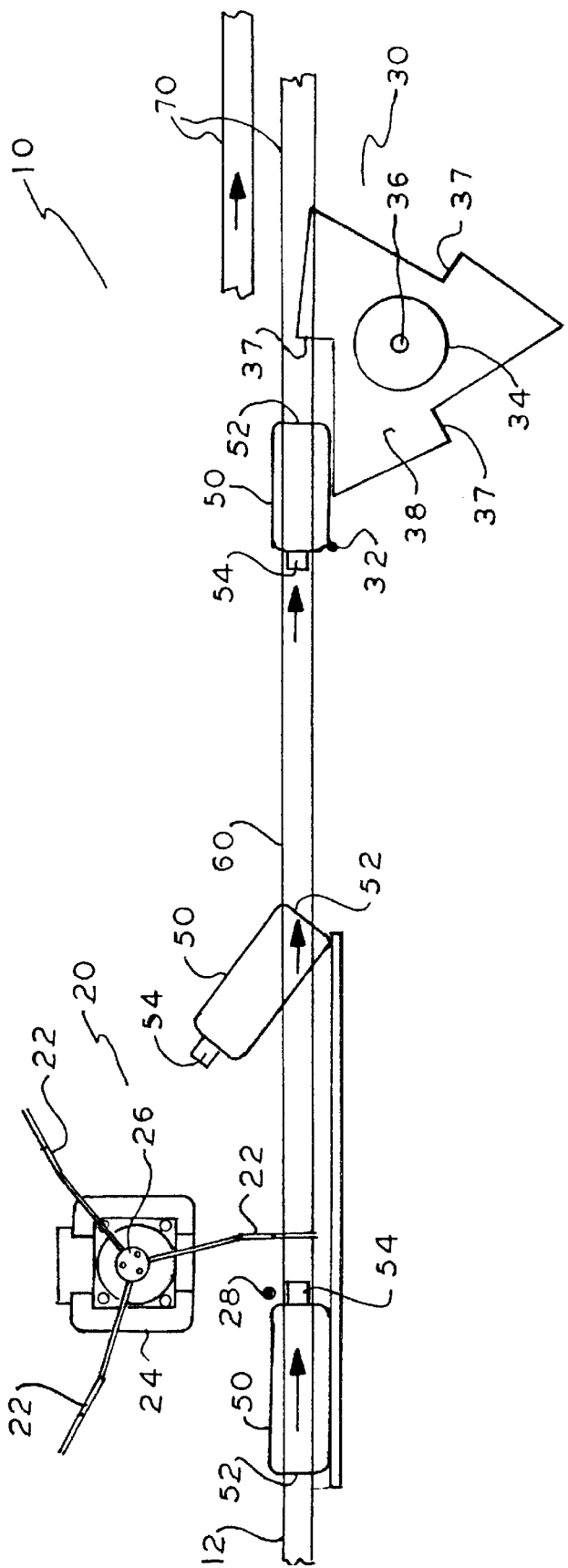
FIG. 1 is a plain view of the high-speed container unscrambler.
Figure 4A:
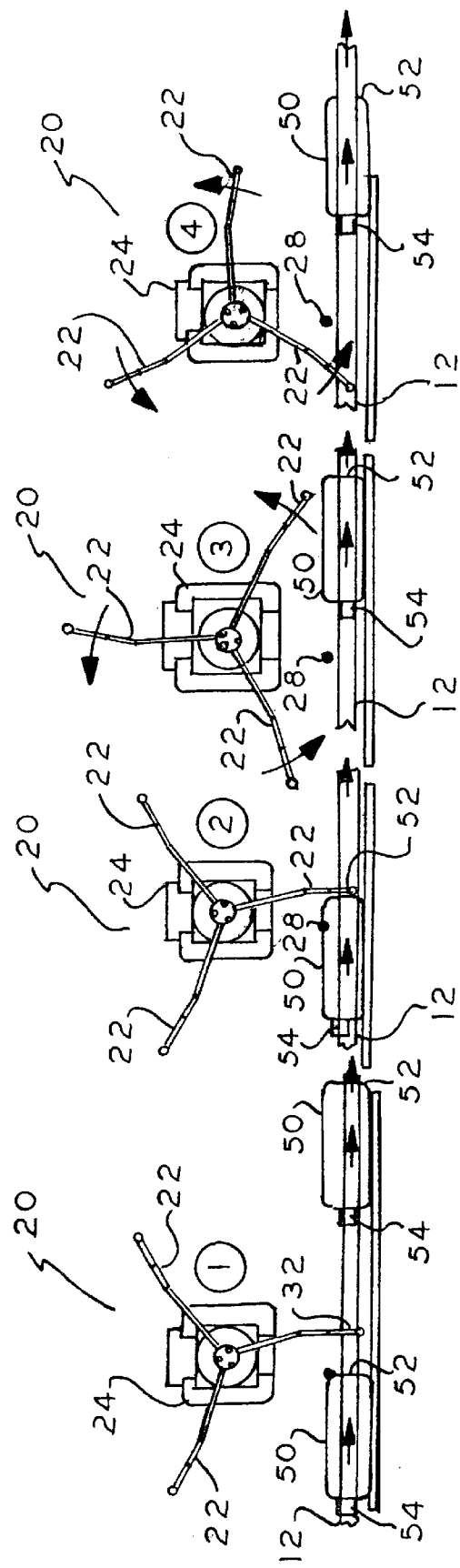
FIG. 4a is a plain view of the high-speed container unscrambler's container alignment mechanism, where containers are shown being processed by the container alignment mechanism in all base leading position.

Referring to FIGS. 1–3, the high-speed container unscrambler 10 is shown to have a container alignment mechanism 20 and a container orientation mechanism 30. In one embodiment, the alignment mechanism 20 has three hooks 22 mounted on the servomotor 24. The servomotor 24 has a rotational axis 26. Furthermore, the unscrambler 10 has a first pair of conveyors 12 between which containers 50 are placed. Containers 50 have a base end 52 and a neck end 54. Referring to FIGS. 4 and 4a, the containers are shown being processed having a leading end as a neck end and as a base end, respectively.

The alignment mechanism 20 receives the containers 50, after the containers 50 pass a photo eye 28. The photo eye 28 detects a container and the photo eye 28 sends a signal to the servomotor 24, which in turn rotates its rotational axis 120 degrees of arc. One of the three hooks 22 pick up the neck of the container 50 and start rotating, while holding the container 50 by its neck, until the container 50 is rotated enough so that it can be placed on the second conveyor 60 with its base end as the leading end. The operation will be repeated with the next neck end leading container. The alignment mechanism 20 is capable of processing at least 500 containers per minute.

If the container 50's leading end is its base end, the photo eye 28 detects a container and sends a signal to the servomotor 24, which in turn rotates its rotational axis 120 degrees of arc (as shown in FIG. 4, for this preferred embodiment). The hook 22 is designed not to engage the container's base end, thus, when the container 50 is approaching with its base end the hook 22 will not pick up container 50, unlike in the situation when the container is approaching with its neck end. As shown in FIG. 4a, the container 50, approaching hook 22 with its base end, passes through without engagement by the hook 22.

Referring to FIGS. 3 and 5, after the bottles pass through the alignment mechanism 20, it is necessary to place the bottles in the upright position. Therefore, the orientation mechanism 30 is engaged. A photo eye 32 is placed next to the second conveyor 60. The photo eye 32 detects the movement of the containers 50 and thus sends a signal to the servomotor 34. The servomotor 34 has a rotational axis 36 on which a pocketed wheel 38 is mounted. The pocketed wheel has pocket sections 37, which receive containers 50. After the containers 50 pass the photo eye 32, the servomotor 34 rotates to receive the containers into pocket sections 37. With the containers in pocket sections 37, the pocketed wheel 38 rotates 90 degrees of arc so that containers are placed in an upright position. After rotation, the containers are released between the conveyor 70, from which they are moved on.

In the above description, the photo eyes 28 and 32 are conventionally known detection mechanism, which are readily available.

In the foregoing description of the invention, reference to the drawings, certain terms, have been used for clarity, conciseness and comprehension. However, no unnecessary limitations are to be implied from or because of the terms used, beyond the requirements of the prior art, because such terms are used for descriptive purposes and are intended to be broadly construed. Furthermore, the description and illustration of the invention are by way of example, and the scope of the invention is not limited to the exact details shown, represented, or described.

While the present invention has been described with reference to specific embodiments, it is understood that the invention is not limited but rather includes any and all changes and modifications thereto which would be apparent to those skilled in the art and which come within the spirit and scope of the appended claims.

What is claimed:

1. An high speed unscrambling means, comprising:
   a) a first conveyor means for movement of containers;
   b) a first sensing means, placed in conjunction with said first conveyor means;
   c) a container alignment means, wherein
      said container alignment means is attached to said first conveyor means;
      said container alignment means further comprising a first electrical rotational means;
      said first electrical rotation means having a first rotational axis;
      a plurality of hooking means coupled to and spaced about said first rotational axis each hooking means of said plurality of hooking means capable of engaging a container when said container is in a neck leading orientation and for reorienting neck leading oriented containers to base leading oriented containers;
   d) said first sensing means, upon detection of a container, for communicating with said first electrical rotational means;
   e) a second conveyor means, for movement of containers, attached after said first conveyor means and said container alignment means;
   f) a second sensing means, placed in conjunction with said second conveyor means;
   g) a container orienting means, wherein
      said container orienting means is attached to said second conveyor means;
      said container orienting means further comprising a second electrical rotational means;

said second electrical rotational means having a second rotational axis; and h) said second sensing means, upon detection of a container, for communicating with said second electrical rotational means.

2. The high speed scrambling means of claim 1, wherein said first sensing means is a photo electric sensor means.

3. The high speed unscrambling means of claim 2, wherein said first sensing means detects arrival of a container and sends a signal to said first electrical rotational means that said container has arrived.

4. The high speed unscrambling means of claim 3, wherein said first sensing means activates said container alignment means when said container is coming, in a neck-end leading orientation.

5. The high speed unscrambling means of claim 1 wherein said each hooking means of said plurality of hooking means is equally spaced apart on said first rotational axis of said first electrical rotational means.

6. The high speed unscrambling means of claim 1, wherein said container alignment means comprises three hooking means juxtaposed at 120 degrees of arc apart.

7. The high speed unscrambling means of claim 1, wherein said first electrical rotational means are capable of rotating an arc distance from one hooking means to another hooking means.

8. The high speed unscrambling means of claim 7, wherein said first electrical rotational means after rotating an arc distance from one hooking means to another hooking means will rotate another arc distance from one hooking means to another hooking means when said first sensing means detects a container.

9. The high speed unscrambling means of claim 1, wherein after rotation of an arc distance from one hooking means to another hooking means, said first electrical rotational means stop and said hooking means releases container between said second conveyor means resulting in all containers being placed with containers' base end forward.

10. The high speed unscrambling means of claim 1, wherein said high speed unscrambling means are capable of processing at least 500 containers per minute.

11. The high speed unscrambling means of claim 1, wherein said second sensing means is a photo electric sensor means.

12. The high speed unscrambling means of claim 10, wherein said second sensing means serves for detecting a container on said second conveyor means and approaching said second electrical rotational means and for initiating rotation of said second electrical rotational means and operation of said container orienting means when said container is in said container orienting means.

13. The high speed unscrambling means of claim 1, wherein said container orienting means further comprises a plurality of pocketing means coupled to said second rotational axis and capable of reorienting containers when said containers are coming in with containers' base end leading and rotating said containers to a stand-on-base position.

14. The high speed unscrambling means of claim 13, wherein said plurality of pocketing means is equally spaced apart on said second rotational axis of said second electrical rotational means.

15. The high speed unscrambling means of claim 13, wherein said container orienting means comprises of three pocketing means juxtaposed at 120 degrees of arc apart.

16. The high speed unscrambling means of claim 13, wherein said second electrical rotational means are capable of rotating an arc distance from one pocketing means to another pocketing means.

17. The high speed unscrambling means of claim 16, wherein said second electrical rotational means after rotating an arc distance from one pocketing means to another pocketing means will rotate another arc distance from one pocketing means to another pocketing means when said second sensing means detects a container coming in with container's flat end.

18. The high speed unscrambling means of claim 13, wherein after rotation of an arc distance from one pocketing means to another pocketing means, said second electrical rotational means stop and said pocketing means releases container between conveyor belts in an upright position with containers standing on containers' flat ends.

19. A high speed unscrambling means, comprising a) a first conveyor means for placement of containers, a first sensing means, a container alignment means;

b) said first sensing means, placed in conjunction with said first conveyor means, wherein
said first sensing means serves to detect whether a container is coming in; and,
said first sensing means activates said container alignment means when a container is coming in with a container's narrow end leading;

c) said container alignment means, wherein
said container alignment means is attached to said first conveyor means;
said container alignment means further comprising a first electrical rotational means;
said first electrical rotational means have a first rotational axis;
said container alignment means further comprises of a plurality of hooking means placed on said first rotational axis and capable of picking up containers when containers are coming in with containers' narrow ends leading and rotating those containers;

d) said first sensing means upon detection of a container communicate with said first electrical rotational means;

e) a second conveyor means, for placement of containers, attached after said first conveyor means and said container alignment means, a second sensing means, a container orienting means;

f) said second sensing means, placed in conjunction with said second conveyor means, wherein
wherein said second sensing means serves to detect whether a container is coming in and if a container is coming in said second sensing means initiates rotation of said second electrical rotational means and rotation of said container orienting means;

g) said container orienting means, wherein
said container orienting means is attached to said second conveyor means;
said container orienting means further comprising a second electrical rotational means;
said second electrical rotational means have a second rotational axis;
wherein said plurality of pocketing means is equally spaced apart on said second rotational axis of said second electrical rotational means;

h) said second sensing means upon detection of a container communicate with said second electrical rotational means.

20. The high speed unscrambling means of claim 19, wherein said container alignment means comprises of three hooking means juxtaposed at 120 degrees of arc apart.

21. The high speed unscrambling means of claim 19, wherein said first electrical rotational means are capable of rotating an arc distance from one hooking means to another hooking means.

22. The high speed unscrambling means of claim 21, wherein said first electrical rotational means after rotating an arc distance from one hooking means to another hooking means will rotate another arc distance from one hooking means to another hooking means when said first sensing means detects a container coming in with container's narrow end.

23. The high speed unscrambling means of claim 19, wherein after rotation of an arc distance from one hooking means to another hooking means, said first electrical rotational means stop and said hooking means releases container between said second conveyor means resulting in all containers being placed with containers flat end forward.

24. The high speed unscrambling means of claim 19, wherein said high-speed unscrambling means are capable of processing at least 500 containers per minute.

25. The high speed unscrambling means of claim 19, wherein said plurality of pocketing means is equally spaced apart on said second rotational axis of said second electrical rotational means.

26. The high speed unscrambling means of claim 19, wherein said container orienting means comprises of three pocketing means juxtaposed at 120 degrees of arc apart.

27. The high speed unscrambling means of claim 19, wherein said second electrical rotational means are capable of rotating an arc distance from one pocketing means to another pocketing means.

28. The high speed unscrambling means of claim 27, wherein said second electrical rotational means after rotating an arc distance from one pocketing means to another pocketing means will rotate another arc distance from one pocketing means to another pocketing means when said second sensing means detects a container coming in with container's flat end leading.

29. The high speed unscrambling means of claim 19, wherein after rotation of an arc distance from one pocketing means to another pocketing means, said second electrical rotational means stop and said pocketing means releases container between conveyor belts in an upright position with containers standing on containers' flat ends.

30. A method of high speed unscrambling of containers, comprising the steps of:
   a) placing containers on a first conveyor means;
   b) moving said containers through a first sensing means, placed in conjunction with said first conveyor means;
   c) aligning said containers using a container alignment means, wherein
      said container alignment means is attached to said first conveyor means;
      said container alignment means further comprises a first electrical rotational means;
      said first electrical rotational means have a first rotational axis;
   d) detecting said containers with said first sensing means and communicating with said first electrical rotational means;
   e) picking up containers with a hook means when containers are coming in with containers' narrow ends forward and rotating with those containers;
   f) placing containers on a second conveyor means, wherein said second conveyor means is attached after said first conveyor means and said container alignment means;
   g) moving containers through a second sensing means, placed in conjunction with said second conveyor means;
   h) orienting containers using a container orienting means, wherein
      said container orienting means is attached to said second conveyor means;
      said container orienting means further comprising a second electrical rotational means;
      said second electrical rotational means have a second rotational axis; and
   i) sensing containers with said second sensing means and communicating with said second electrical rotational means.

31. The method of claim 30, further comprising the step of detecting with said first sensing means whether a container is coming in.

32. The method of claim 30, further comprising the steps of activating said container alignment means with said first sensing means when a container is coming in with a container's narrow end forward.

33. The method of claim 30, further comprising the steps of rotating said first electrical rotational means an arc distance from one hooking means to another hooking means.

34. The method of claim 33, further comprising the steps of rotating said first electrical rotational means an arc distance from one hooking means to another hooking means and rotating another arc distance from one hooking means to another hooking means when said first sensing means detects a container coming in with container's narrow end.

35. The method of claim 30, further comprising the steps of stopping said first electrical rotational means after rotation of an arc distance from one hooking means to another hooking means, and said hooking means releasing container between said second conveyor means resulting in all containers being placed with containers' flat end forward.

36. The method of claim 30, further comprising the steps of detecting, with said second sensing means, a container on said second conveyor means and approaching said second electrical rotational means and for initiating rotation of said second electrical rotational means when said container is in said container orienting means.

37. A method of high speed unscrambling of containers, comprising the steps of:
   a) placing containers on a first conveyor means;
   b) moving counters through a first sensing means, placed in conjunction with said first conveyor means;
   c) aligning containers using a container alignment means, wherein
      said container alignment means is attached to said first conveyor means;
      said container alignment means further comprises a first electrical rotational means;
      said first electrical rotational means have a first rotational axis;
   d) detecting containers with said first sensing means and communicating with said first electrical rotational means;
   e) placing containers on a second conveyor means, wherein said second conveyor means is attached after said first conveyor means and said container alignment means;
   f) moving containers through a second sensing means, placed in conjunction with said second conveyor means;
   g) orienting containers using a container orienting means, wherein
      said container orienting means is attached to said second conveyor means;

said container orienting means further comprising a second electrical rotational means;

said second electrical rotational means having a second rotational axis with a plurality of pocketing means coupled to and spaced about said second rotational axis and picking up containers when containers are in a pocket means of said plurality of pocket means with containers' base ends leading, by rotating containers to a standing position about said second rotational axis;

h) sensing containers with said second sensing means and communicating with said second electrical rotational means.

38. The method of claim 37, further comprising the steps of rotating said second electrical rotational means an arc distance from one pocketing means to an adjacent pocketing means.

39. The method of claim 38, further comprising the steps of rotating container using said second electrical rotational means an arc distance from one pocketing means to another pocketing means when said second sensing means detects a container coming in with container's flat end.

40. The method of claim 37, further comprising the steps of stopping said second electrical rotational means with said container in said pocketing means in an upright, standing condition, and releasing said container to a conveyor belt, said conveyor belt operating in conjunction with said container orienting means.

41. The method of claim 37, wherein said aligning and orienting of containers occurs at a speed of at least 500 containers per minute.

\* \* \* \* \*